United States Patent [19]

Sekino

[11] Patent Number: 4,549,640
[45] Date of Patent: Oct. 29, 1985

[54] OPERATION SYSTEM FOR HOISTING DEVICE

[75] Inventor: Syoichi Sekino, Ibaraki, Japan

[73] Assignee: Hitachi Construction Machinery Co., Ltd., Tokyo, Japan

[21] Appl. No.: 460,803

[22] Filed: Jan. 25, 1983

[30] Foreign Application Priority Data

| Jan. 28, 1982 | [JP] | Japan | 57-10906 |
| Jan. 28, 1982 | [JP] | Japan | 57-10907 |
| Jan. 28, 1982 | [JP] | Japan | 57-10908 |
| Jan. 28, 1982 | [JP] | Japan | 57-10909 |
| Jan. 28, 1982 | [JP] | Japan | 57-10910 |
| Jan. 28, 1982 | [JP] | Japan | 57-10911 |

[51] Int. Cl.$^4$ .................... B60K 41/28; B60K 41/24
[52] U.S. Cl. .................... 192/0.094; 192/3 S; 192/8 R; 192/9; 192/17 A; 254/366
[58] Field of Search ............. 192/17 A, 17 C, 12 C, 192/3 N, 3 S, 0.072, 0.055, 0.075, 0.082, 0.094, 7, 8 R, 9; 254/366, 361

[56] References Cited

U.S. PATENT DOCUMENTS

| 2,947,397 | 8/1960 | Pietsch . | |
| 3,819,156 | 6/1974 | Sieracki . | |
| 4,029,189 | 6/1977 | Freiburger | 192/12 C |
| 4,447,044 | 5/1984 | Nakata | 192/12 C |

*Primary Examiner*—George H. Krizmanich
*Attorney, Agent, or Firm*—Antonelli, Terry & Wands

[57] ABSTRACT

An operation system for a hoisting device having a hydraulic motor for driving the hoisting device, a clutch mechanism for connecting and disconnecting the motor and the hoisting device cylinder, a foot pedal for applying a brake to the hoisting device by the control of an operator, and an automatic brake mechanism for applying an automatic brake to the hoisting device. The operation system further has first, second and third directional control valves each having a first position and a second position and connected between a hydraulic fluid source and a reservoir and cylinders of the clutch mechanism and automatic brake mechanism to operate such that only when the first and second valves are both in the first position the clutch cylinder is brought into communication with one of the hydraulic fluid source and the reservoir which serves for the clutch disconnection thereby to cause the clutch mechanism to be disconnected and only when the first valve is in the second position and the third valve is in the first position the brake cylinder is brought into communication with the reservoir to cause the automatic brake mechanism to apply the brake, and first, second and third operation devices for operating the first, second and third valves, respectively. The second and third operation devices being operative in response to inoperation and operation of the hydraulic motor in such a manner that when the hydraulic motor is inoperative the second and third valves are in the first position and when the hydraulic motor is operative the second and third valves are in the second position.

15 Claims, 13 Drawing Figures

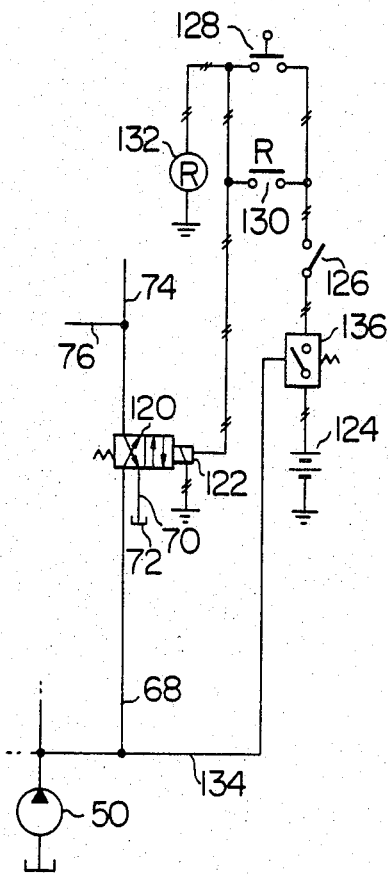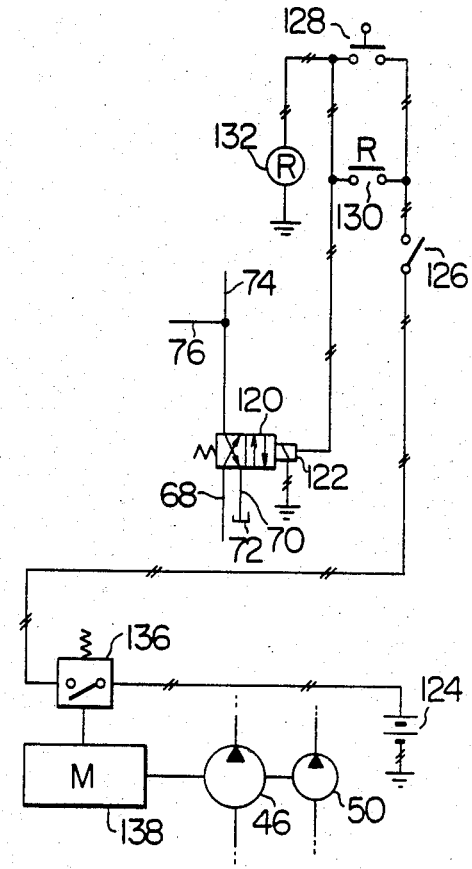

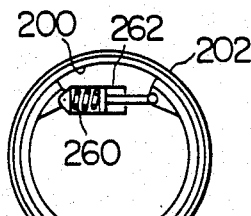
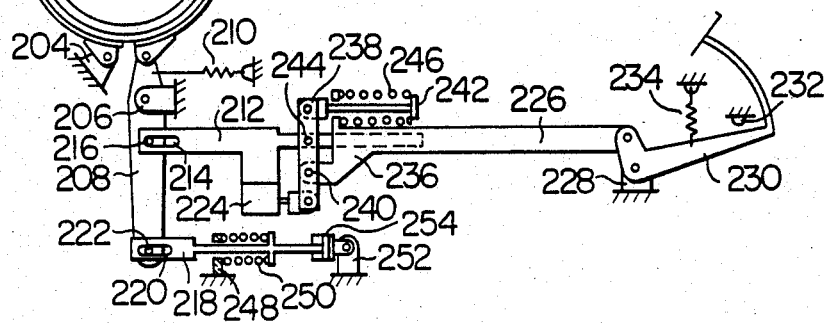
FIG. 9
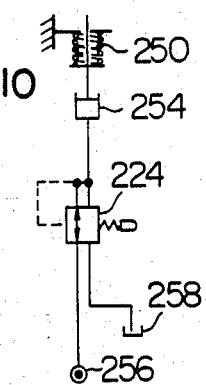
FIG. 10

OPERATION SYSTEM FOR HOISTING DEVICE

BACKGROUND OF THE INVENTION

This invention relates to operation systems for hoisting devices of construction machinery such as cranes, and more particularly it is concerned with an operation system for a hoisting device of the type comprising a clutch mechanism, a foot brake mechanism and an automatic brake mechanism.

One type of operation system for a hoisting device of a crane known in the art comprises a clutch mechanism for connecting and disconnecting a hydraulic motor and the hoisting device, a foot brake mechanism for applying a foot brake to the hoisting device by the control of an operator, and an automatic brake mechanism for applying an automatic brake to the hoisting device.

The clutch mechanism comprises a clutch cylinder and a spring operative such that when the clutch cylinder is in communication with a reservoir the spring performs clutch disconnection and when the clutch cylinder is in communication with a hydraulic fluid source the clutch cylinder performs clutch connection with a hydraulic fluid supplied from the hydraulic fluid source. Thus, it is possible to perform clutch connection and clutch disconnection by controlling the introduction of the hydraulic fluid into the clutch cylinder.

The foot brake mechanism functions as a positive brake system which applies the brake to the hoisting device only when the operator manipulates it.

The automatic brake mechanism comprises a brake cylinder and a spring operative such that when the brake cylinder is in communication with the reservoir the spring applies the brake and when the brake cylinder is in communication with the hydraulic fluid source the brake cylinder releases the brake with a hydraulic fluid supplied from the hyraulic fluid source. Thus, the automatic brake mechanism in which the brake cylinder is brought into communication with the reservoir when an operation lever for the hoisting device is in a neutral position and the brake cylinder is brought into communication with the hydraulic fluid source when the operation lever is in a non-neutral position functions as a negative brake system which normally applies the brake to the hoisting device and releases the brake when the operation lever is moved for lifting or lowering operation.

One example of the operation system for the hoisting device of such a construction is disclosed in Japanese Utility Model Application Laid-Open No. 110971/79.

Thus, in such an operation system, it is possible to perform a negative brake opration by turning on the automatic brake mechanism and the clutch mechanism. In the negative brake operation, it is possible to carry out holding of a suspended load by using the automatic brake and lifting and power lowering of the suspended load by releasing the automatic brake. By turning off the automatic brake mechanism, it is possible to perform a positive brake operation by utilizing the foot brake mechanism. In this case, it is possible to perform lifting and power lowering of a suspended load by turning on the clutch mechanism and it is possible to perform free fall of the suspended load by turning off the clutch mechanism.

The operation system for the hoisting device of the prior art has suffered the disadvantage that on-off control of the automatic brake mechanism and on-off control of the clutch mechanism should be performed by the operator himself independently and separately. Thus, the operator has to perform the aforesaid on-off controls in addition to the controls of the operation lever for the hoisting device and the foot brake mechanism, with a result that the operator has to perform a complicated operation and misoperation tends to occur.

Also, in the operation system of the prior art, it sometimes happens to hold a suspended load by a hydraulic brake comprising the hydraulic motor and a counterbalance valve connected to the circuit of the hydraulic motor by turnig off the automatic brake mechanism and turning on the clutch mechanism. When this is the case, lowering of the suspended load would occur due to leaks of the oil from the hydraulic motor.

SUMMARY OF THE INVENTION

An object of this invention is to provide an operation system for a hoisting device in which operation is simplified and the risks of misoperation are minimized.

Another object is to provide an operation system for a hoisting device which does not cause holding of a suspended load only by a hydraulic brake comprising a hydraulic motor and a counterbalance valve connected to the circuit of the hydraulic motor.

According to the invention, there is provided an operation system for a hoisting device comprising a hydraulic motor for driving the hoisting device, clutch means for connecting and disconnecting the hydraulic motor and the hoisting device, said clutch means including clutch cylinder means and spring means operative such that when the clutch cylinder means is in communication with a reservoir, the spring means performs one of clutch connection and clutch disconnection, and when the clutch cylinder means is in communication with a hydraulic fluid source the clutch cylinder means performs the other of clutch connection and clutch disconnection with a hydraulic fluid supplied from the hydraulic fluid source, foot brake means for applying a foot brake to the hoisting device by the control of an operator, and automatic brake means for applying an automatic brake to the hoisting device, said automatic brake means including brake cylinder means and spring means operative such that then the brake cylinder means is in communication with the reservoir, the spring means applies the brake, and when the brake cylinder means is in communication with the hydraulic fluid source, the brake cylinder means releases the brake with a hydraulic fluid supplied from the hyraulic fluid source, wherein the operation system further comprises (a) first, second and third directional control valve means each having a first position and a second position, said first, second and third valve means being connected between the hydraulic fluid source and reservoir and the clutch and brake cylinder means to operate such that only when the first and second valve means are both in the first position, the clutch cylinder means is brought into communication with one of the hydraulic fluid source and the reservoir which serves for the clutch disconnection thereby to cause the clutch means to be disconnected and only when the first valve means is in the second position and the third valve means is in the first position, the brake cylinder means is brought into communication with the reservoir to cause the automatic brake means to apply the brake; and (b) first, second and third operation means for operating the first, second and third directional control valve means respectively, (c) the second and third actuation means being operative in response to inoperation and operation of the hydraulic motor in such a manner that when the hydraulic motor is inoperative the second and third valve means are in the first position and when the hydraulic motor is operative the second and third valve means are in the second position.

BRIEF DESCRIPTION OF THE DRAWINGS

FIG. 4 an electric circuit diagram showing a still another modification of the modification shown in FIG. 3;

FIG. 5 is an electric circuit diagram showing a further modification of the modification shown in FIG. 3;

FIG. 9 is a schematic view of the general construction of the operation system for the hoisting device having the foot brake mechanism of special construction, shown in an inoperative condition;

FIG. 10 is a hydraulic fluid circuit diagram showing the position of the variable pressure reducing valve of the construction shown in FIG. 9, shown in a condition in which the brake is inoperative;

DESCRIPTION OF THE PREFERRED EMBODIMENTS

Figure 1:
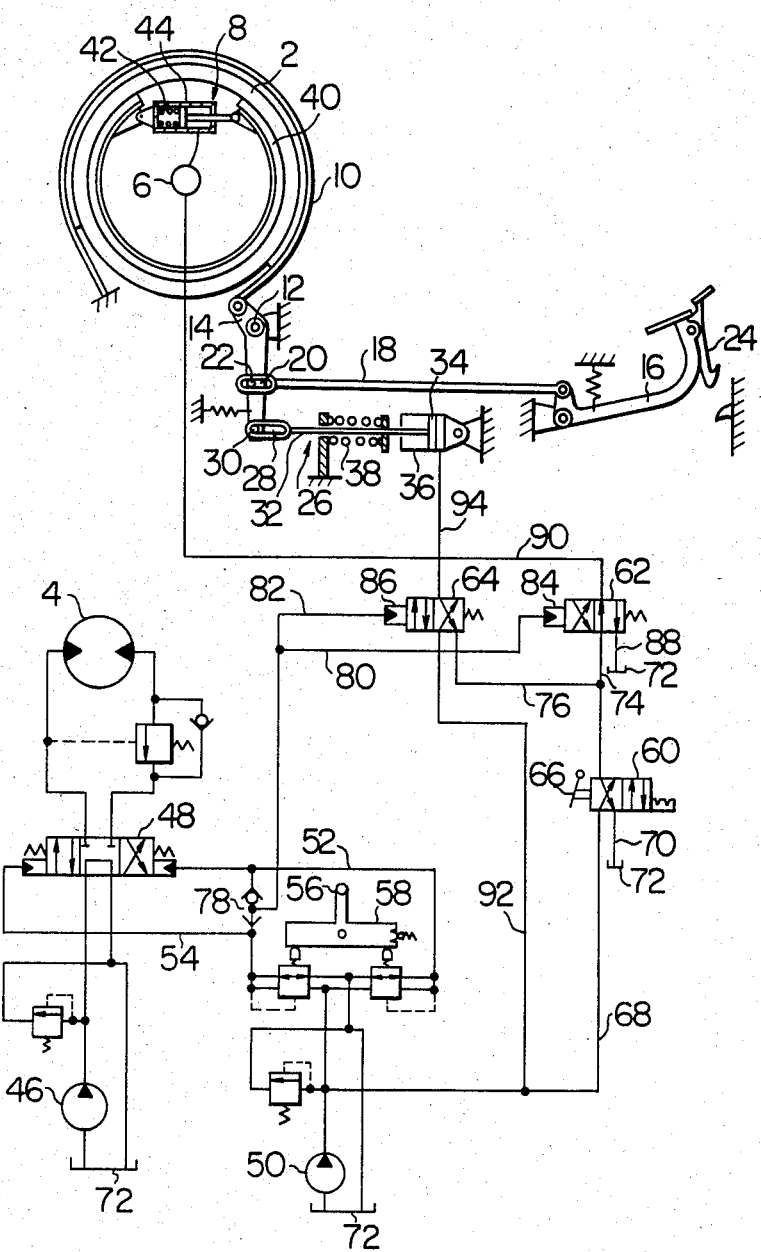
FIG. 1 is a hydraulic fluid circuit diagram of the operation system for a hoisting device comprising one embodiment of this invention.

In FIG. 1, the numeral 2 designates a hoisting device having a hoisting drum adapted to be driven by a hydraulic motor 4 through a clutch mechanism 8 connected to a drive shaft 6 of the motor 4.

The drum 2 has a brake band 10 secured at one end and wound on an outer periphery of the drum 2, the brake band 10 being connected at the other end to one end of a link 14 pivotable about a pin 12 and having near the other end, a pin 22 received in a slot 20 formed at one end portion of a rod 18 connected at the other end to a foot pedal 16, so that the brake can be applied to the hoisting drum 2 when the foot pedal 16 is depressed. The numeral 24 denotes a pedal lock.

Connected to the other end of the link 14 is an automatic brake mechanism 26 having a rod 32 formed at one end with a slot 28 receiving a pin 30 attached to the other end of the link 14, a brake cylinder 36 having a piston 34 connected to the rod 32, and a spring 38. The automatic brake mechanism 26 operates such that when hydraulic fluid is supplied to the brake cylinder 36, the rod 32 moves against the spring 38 leftwardly in the figure to release the brake; when the hydraulic fluid is released from the brake cylinder 36, the spring 38 urges the rod 32 to move rightwardly in the figure to apply the brake.

The clutch mechanism 8 has a clutch element 40 rotatable with the drive shaft 6 driven by the hydraulic motor 4, and a clutch cylinder 44 having a spring 42 therein. The clutch mechanism 8 operates such that when hydraulic fluid is supplied to the clutch cylinder 44, the clutch cylinder 44 is contracted against the spring 42 to disengage the clutch connection; when the hydraulic fluid is released, the spring 42 urges the clutch cylinder 44 to move to an extended position to establish the clutch connection.

Mounted between the hydraulic motor 4 and a hydraulic pump 46 in a main circuit is a main circuit control valve 48 which in this embodiment is a hydraulically operated directional control valve having opposed operation chambers, and an operation valve mechanism 58 having an operation lever 56 is mounted in lines 52 and 54 connecting the operation chambers to a hydraulic pump 50 serving as a working hydraulic fluid source and a reservoir 72. When the operation lever 56 is moved rightwardly in the figure, the main circuit control valve 48 is changed to take a right position to allow the hydraulic motor 4 to rotate in a lifting direction and when it is moved leftwardly the main circuit control valve 48 is changed to take a left position to allow the hydraulic motor 4 to rotate in a lowering direction. When the operation lever 56 is in a neutral position in which it is shown in the figure, the valve 48 brings the motor 4 to an inoperative condition.

The numerals 60, 62 and 64 designate first, second and third directional control valves, respectively, connected according to the invention. The first directional control valve 60 is a 3-port 2-position valve having an operation lever 66. The valve 60 can be switched from a right position or a first position to a left position or a second position, or vice versa, in the figure as the operation lever 66 is manipulated. Two primary side ports of the first valve 60 are connected through lines 68 and 70 to the hydraulic pump 50 and a reservoir 72, respectively, and a secondary side port is connected through lines 74 and 76 to one of primary side ports of the second valve 62 and one of primary side ports of third valve 64, respectively. The second and third directional control valves 62 and 64 are hydraulically operated 3-port 2 position valves having operation chambers 84 and 86 connected through lines 80 and 82 and shuttle valve 78 to the lines 52 and 54. When the operation lever 56 is in a non-neutral position, one of the lines 52 and 54 which is higher in pressure is selected by means of the shuttle valve 78 to supply hydraulic fluid to the operation chambers 84 and 86 through the lines 80 and 82, respectively, so that the valves can be shifted from a right position or first position as shown to a left position or a second position. When the operation lever 56 is in a neutral position, the valves 62 and 64 are shifted from the second position to the first position. The other primary side port of the second directional control valve 62 is connected to the reservoir 72 through a line 88 and a secondary side port thereof is connected through a line 90 to the clutch cylinder 44. The other primary side port of the third directional control valve 64 is connected to the hydraulic pump 50 through a line 92 and a secondary side port thereof is connected to the brake cylinder 36 through a line 94.

In operation, assume that the first directional control valve 60 is located in the left position or second position as shown in FIG. 1. Then the first directional control valve 60 blocks a supply of the working hydraulic fluid and the primary side ports of the second and third directional control valves 62 and 64 connected to the lines 74 and 76 are under a reservoir pressure. If the operation lever 56 of the operation valve mechanism 58 is in a neutral position at this time, the second and third valves 62 and 64 are in the right position or first position as shown in the figure because they are not actuated, so that the clutch cylinder 44 and brake cylinder 36 are both communicated with the reservoir 72 to allow the clutch connection and apply the brake by the actions of the springs 42 and 38, respectively. Thus, the hoisting drum 2 is held in a condition in which the brake is automatically applied thereto, even if the foot pedal 16 is released.

Assume that the operation lever 56 is moved rightwardly or leftwardly to operate the hydraulic motor 4 in a lifting or lowering direction. Then a higher pressure fluid selected by the shuttle valve 78 is introduced into the operation chambers 84 and 86 of the second and third valves 62 and 64 thereby to move them to the left positions or second positions. At this time, the clutch cylinder 44 is held in communication with the reservoir 72 through the line 90, second valve 62 and line 88, so that the clutch remains connected. Meanwhile, the brake cylinder 36 is brought into communication with the hydraulic pump 50 via the line 94, third valve 64 and line 92. This allows the hydraulic fluid to be led to the brake cylinder 36 to permit the rod 32 to move leftwardly against the spring 38 thereby to release the automatic brake applied to the hoisting drum 2 and allow same to perform a lifting or power lowering operation.

When the first directional control valve 60 is shifted to the right position or first position, the operation is as follows. If the operation lever 56 is in its neutral position the second and third valves 62 and 64 are not actuated and held in the right or first position, and therefore the working fluid is supplied to the clutch cylinder 44 via the first and second valves 60 and 62 and lines 68, 74 and 90 thereby to disengage the clutch connection. The working fluid is also supplied to the brake cylinder 36 via the first and third valves 60 and 64 and lines 68, 76 and 94 thereby to release the automatic brake applied to the hoisting drum 2. Thus, an operator can apply the brake to the hoisting drum 2 by depressing the foot pedal 16 and release it by releasing the foot pedal 16 without being influenced by the automatic brake mechanism 26, and also can conduct free fall of suspended load when the operation lever 56 is brought to its neutral position.

If the operation lever 56 is moved rightwardly or leftwardly to operate the hydraulic motor 4 with the first valve 60 in the right position, the second and third valves 62 and 64 are shifted to the left position in the aforesaid manner, so that the second valve 62 blocks the supply of working fluid through the first valve 60 to the clutch cylinder 44 and allows the clutch cylinder 44 to be brought into communication with the reservoir 72 so that the clutch connection is established. Meanwhile as for the brake cylinder 36, working fluid is continued to be supplied thereto via the line 92, third valve 64 and line 94 without flowing through the first directional control valve 60, so that no automatic brake is applied to allow lifting or power lowering of suspended load to be performed.

Operations of the embodiment shown in FIG. 1 can be summarized in a tabulated form as follows by classifying them into operations with the automatic brake on and operations with the automatic brake off.

TABLE I

Operations of the hoisting device by means of the foot pedal 16 by turning off the automatic brake mechanism 26 (positive brake operation, with the first valve 60 in the right or first position)

| Operation Lever 56 | Clutch | Automatic Brake | Positive Brake | Operation of Hoisting Device |
|---|---|---|---|---|
| Neutral | on | Off | On | Holding of Suspended Load |
|  |  |  | Off | Free Fall |
| Lifting | On | Off | Off | Lifting |
| Lowering | On | Off | Off | Lowering (Power Lowering) |
| Prime Mover Shut Down During Lifting and Lowering | On | Off | Off | Suspended Load Held |

TABLE II

Operation of the hoisting device by turning on the automatic brake mechanism 26 (negative brake operation, with the first valve 60 in the left or second position)

| Operation Lever 56 | Clutch | Automatic Brake | Positive Brake | Operation of Hoisting Device |
|---|---|---|---|---|
| Neutral | On | On | Off | Holding of Suspended Load |
| Lifting | On | Off | Off | Lifting |
| Lowering | On | Off | Off | Lowering (Power Lowering) |
| Prime Mover Shut Down During Lifting and Lowering | On | On | Off | Suspended Load Held |

From the foregoing description, it will be appreciated that in the embodiment shown and described hereinabove, it is possible to perform lifting or power lowering by actuating the operation lever 56 irrespective of the position of the first directional control valve 60 and to obtain free fall of the suspended load only by actuating the first directional control valve 60. Also, when the first valve 60 is shifted to the left position, it is possible to perform a negative brake operation utilizing the automatic brake mechanism 26, and when it is shifted to the right position, it is possible to perform a positive brake operation by means of the foot pedal 16. When the first valve 60 is shifted to either position, it is possible to operate the hoisting drum 2 only by actuating the operation lever 56. In the event that a prime mover, not shown, for the hydraulic pumps 46 and 50 is shut down or stopped while lifting or power lowering is being performed, the hoisting drum 2 can be kept in a condition in which the brake is applied and the clutch is engaged by the actions of the springs 38 and 42 thereby to avoid falling of the suspended load by the braking and clutching actions. If the first valve 60 is brought to the right position when the hydraulic motor 4 is stopped, the clutch mechanism 8 is necessarily disengaged, and therefore if it is desired to hold the suspended load by means other than the foot pdeal 16, the automatic brake mechanism 26 must be turned on by shifting the first valve 60 to its left position. Thus, the use of the hydraulic brake comprising the hydraulic motor and the counterbalance valve mounted in the main circuit of the hydraulic motor for holding the suspended load can be totally avoided, and therefore lowering of the suspended load due to leaks of hydraulic fluid from the hydraulic motor can be avoided which might otherwise occur when such hydraulic brake is relied on.

In the embodiment described by referring to FIG. 1, the first directional control valve 60 had been described as being of the manually operated type. However, the invention is not limited to this specific type of valve and any valve may be used so long as it can be actuated to switch the position as desired. To this end, a solenoid operated valve or a hydraulically operated valve may be used. Also, solenoid operated valves may be used as the second and third directional control valves 62 and 64 and a switch may be used to actuate the solenoid operated valves by being linked to the operation lever 56.

Figure 2:
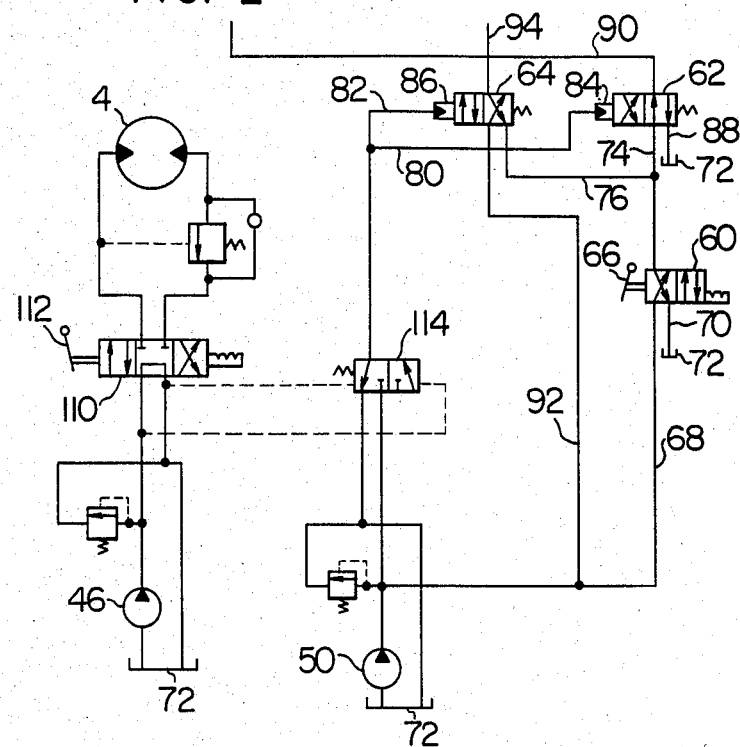
FIG. 2 is a fragmentary hydraulic fluid circuit diagram showing a modification of the operation devices for the second and third directional control valves of the embodiment shown in FIG. 1.

FIG. 2 shows a modification of the embodiment shown in FIG. 1 in which the operation devices for the main circuit control valve 48 and the second and third directional control valves 62 and 64 are distinct from those shown in FIG. 1. In the modified embodiment, the main circuit control valve designated by the numeral 110 is a manually operated valve having an operation lever 112, and the operation device for the second and third directional control valves 62 and 64 comprises a directional control valve 114 adapted to be actuated by a pressure in a portion of the main circuit between the main circuit control valve 110 and the pump 46 and reservoir 72. The directional control valve 114 is a 3-port 2-position valve which is in a left position as shown when the main circuit directional control valve 110 is in a neutral position and which is shifted to a right position when the valve 110 is shifted to a non-neutral position. Two primary side ports of the valve 114 are connected to the reservoir 72 and pump 50 and a secondary side port thereof is connected to the operation chambers 84 and 86 of the valves 62 and 64 through the lines 80 and 82. It will be understood that like the embodiment shown in FIG. 1, the modification shown in FIG. 2 operates in response to operation and inoperation of the hydraulic pump 4 to automatically switch the positions of the second and third directional control valves 62 and 64.

In the modified embodiment shown in FIG. 2, the second and third valves 62 and 64 are hydraulically operated valves. However the invention is not limited to this specific form of valves and solenoid operated valves may be used instead which are responsive to an electric signal produced by suitable means in response to operation and inoperation of the hydraulic pump 4.

Figure 3:
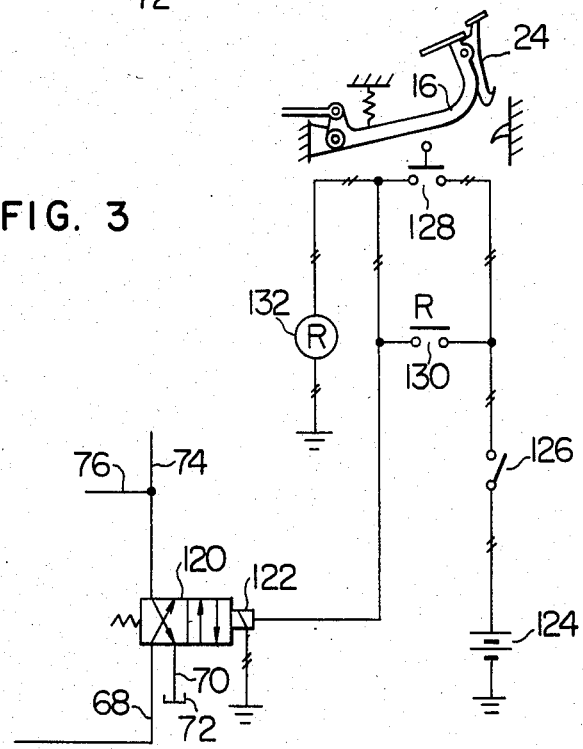
FIG. 3 is an electric circuit diagram showing a modification of the operation device for the first directional control valve of the embodiment shown in FIG. 1.

FIG. 3 shows a modification of the operation device for the first directional control valve 60 of the embodiment shown in FIG. 1, in which a solenoid operated valve designated by the numeral 120 is used in place of the manually operated valve 60 shown in FIG. 1. The solenoid operated valve 120 has connected to its solenoid section (coil) 122 an electric circuit comprising a power source 124, a power source switch 126 for turning on and off the power source 124, a normally open switch 128 that can be closed by depressing the foot pedal 16, and a relay 132 energized when the switches 126 and 128 are closed to close a contact 130 thereof so as to continuously pass a current to the solenoid section 122. In this modification, the relay 132 is arranged parallel with the solenoid operating section 122, but it may be arranged in series therewith.

In the modification shown and described hereinabove, no current is passed to the solenoid section 122 of the first directional control valve 120 when the power source switch 126 is in an open position, so that the first valve 120 is located in a left or second position. This turns on the automatic brake mechanism 26 to enable the hoisting drum 2 to perform the operations described by referring to the first embodiment shown in FIG. 1 and summarized in Table II.

When the power source switch 126 is closed, the first valve 120 is not actuated and keeps the automatic brake mechanism 26 on, unless the foot pedal 16 is depressed. If the foot pedal 16 is depressed, then the switch 128 is closed and a current is passed to the solenoid section 122 to shift the first valve 120 to a right or first position and at the same time energize the relay 132 to close its contact 130. Once the contact 130 is closed, a current is continuously passed to the relay 132 through the power source switch 126 and contact 130 even if the foot pedal 16 is restored to its original position, and a current is also continuously passed to the solenoid section 122. This turns off the automatic brake mechanism 26 and enables the hoisting drum 2 to perform the operations described by referring to the embodiment shown in FIG. 1 and summarized in Table I.

In the modification shown in FIG. 3 and described hereinabove, it is essential to depress the foot brake 16 when the automatic brake operation is turned off. This avoids the accident of the suspended load falling due to the error of the operator forgetting to depress the foot pedal when he performs the operation of switching the automatic brake mechanism from its operative condition to its inoperative condition.

FIG. 4 shows a modification of the electric circuit connected to the solenoid section 122 of the first directional control valve 120 shown in FIG. 3. The modified form of the electric circuit has a pressure switch 136 connected through a line 134 to the delivery line of the hydraulic pump 50 and connected in series with the power source switch 126. The switch 136 is adapted to close when the pressure in the circuit rises above a predetermined level. By this arrangement, the relay 132 can be de-energized when the prime mover for driving the hydraulic pumps 46 and 50 is shut down.

In the modification shown in FIG. 3, if the prime mover is shut down or the operator stops operation while the hoisting drum is being operated with the foot brake mechanism being turned on, the hydraulic pump 50 is rendered inoperative and the pressure of the hydraulic fluid source is cut off while the automatic brake mechanism 26 is turned on by the action of the spring 38 as aforesaid, so that there would be no risks when the operation is interrupted. However, if the operator forgets to lock the foot pedal 16 in the depressed condition and keeps the power source switch 126 on, then there would be the risk of the suspended load falling when the operation is restarted. More specifically, if the relay 132 remains energized and the contact 130 remains closed and the first directional control valve 120 is in the right position when the operation is interrupted, and if the operation is restarted in such a state, then the working fluid is supplied from the hydraulic pump 50 and turns off the automatic brake mechanism 26 when the pressure of the hydraulic fluid rises to a value higher than that of the biasing force of the spring 38 and capable of moving the rod 32. Thus, if the foot pedal 16 were not depressed when the operation is restarted with a suspended load, there would be the danger of the load falling. However, the provision of the pressure switch 136 brought to an open position as the pressure of the hydraulic fluid source is cut off as shown in FIG. 4 ensures that the relay 132 is de-energized and selfholding thereof is released when the operation is interrupted and makes it imperative to actuate the foot pedal 16 when the operation is restarted because it is impossible to shift the first valve 120 unless the foot pedal 16 is depressed, thereby avoiding an unexpected fall of the suspended load.

In the modification shown in FIG. 4, connection and disconnection of the circuit is effected by means of the pressure switch 136 connected to the hydraulic pump 50 when the operation is interrupted and restarted. In place of the aforesaid arrangement, the pressure switch 136 may be mounted, as shown in FIG. 5, in a lubricant circuit of a prime mover 138. Also, although not shown, an electric switch may be used in place of the pressure switch 136 which would be mounted in the vicinity of the prime mover and adapted to open and close as the operation is interrupted or restarted.

Also a structure may be used which would make it impossible to close the power source switch 126 unless the prime mover is in operation and which would automatically bring the power source switch 126 to an open position when the operation is interrupted.

Figure 6:
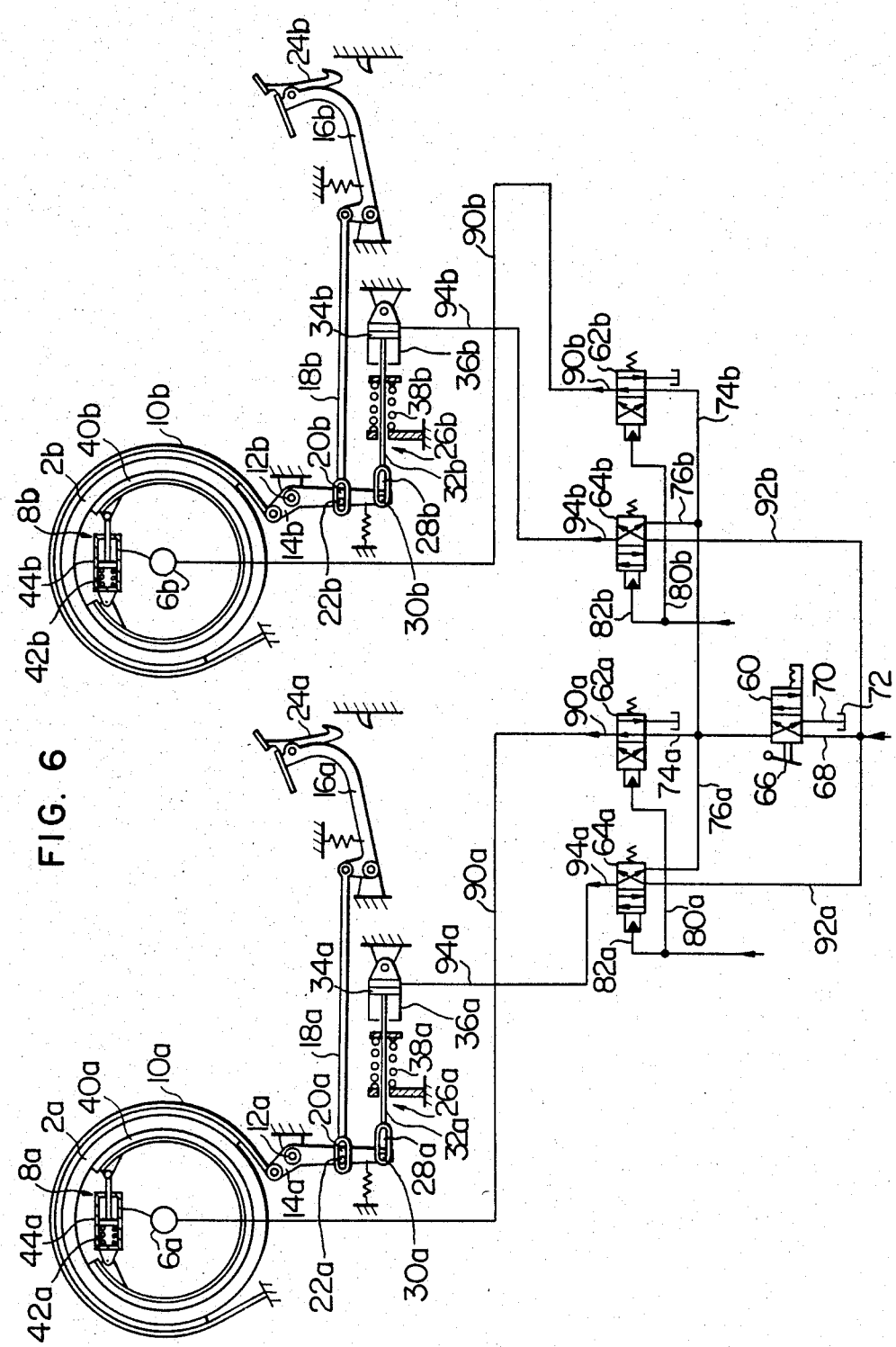
FIG. 6 is a fragmentary hydraulic fluid circuit diagram showing a modificiation of the embodiment shown in FIG. 1 in which the operation system is for a plurality of hoisting drums.

FIG. 6 shows a main portion of a modification of the embodiment shown in FIG. 1 in which the invention is incorporated in a plurality of hoisting devices or drums. In the figure, parts similar to those shown in FIG. 1 are designated by like reference characters and two members corresponding to the two hoisting drums are designated by reference numerals having subscripts a and b. The portion of the modification which is not shown in FIG. 6 comprises two identical portions each corresponding to the same portion of the embodiment shown in FIG. 1, and these portions can be connected to the circuit shown in FIG. 6 by adding the subscripts a and b.

When the invention is applied to a plurality of hoisting drums, the first, second and third directional control valves 60, 62 and 64 may be provided each in the same number as the hoisting drums or two (2) in this embodiment. However, simplification of the mechanism of the operation system can be achieved if, as is the case with this modification, the first valve 60 is shared by the two hoisting drums and two second valves 62a and 62b and two third valves 64a and 64b corresponding to the two drums are connected in parallel with each other to the secondary side port of the first valve 60.

Figure 7:
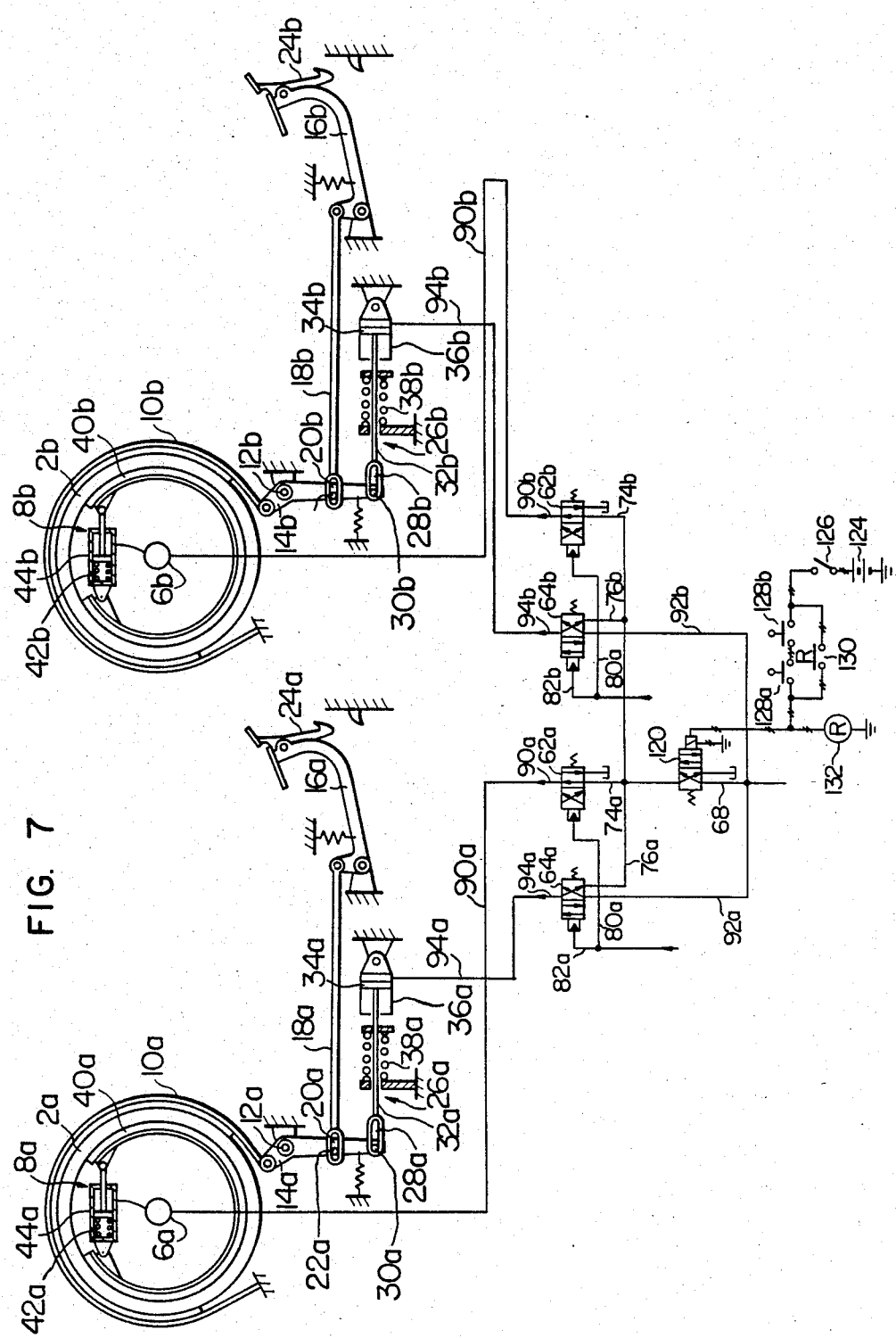
FIG. 7 is a fragmentary hydraulic fluid circuit diagram similar to FIG. 6 but showing a modification of the modification of FIG. 3 as being worked with the operation system for a plurality of hoisting drums.

When the embodiment shown in FIG. 1 including the modification shown in FIGS. 3, 4 or 5 is incorporated in a plurality of hoisting drums, one has only to connect, as shown in FIG. 7, switches 128a and 128b in series with each other which are closed as the respective foot pedals for the hoisting drums are depressed, such switches 128a and 128b being connected in parallel with the relay contact 130.

Figure 8:
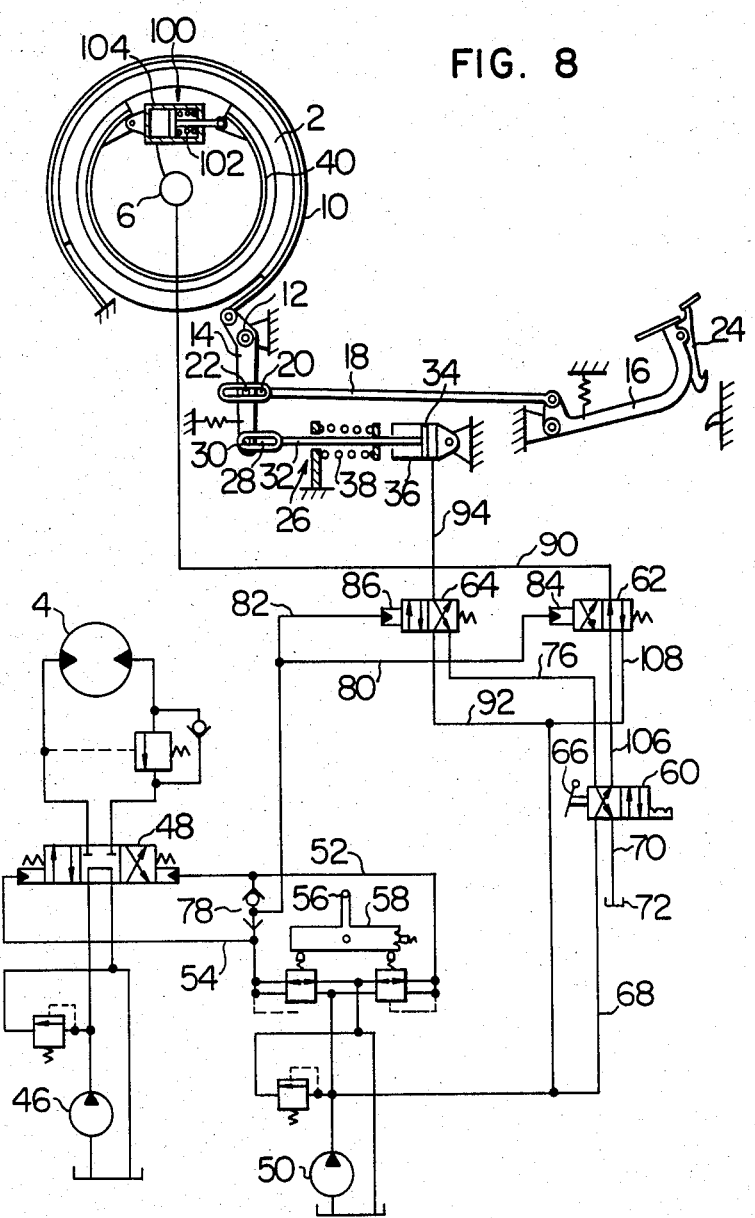
FIG. 8 is a hydraulic fluid circut diagram similar to FIG. 1 but showing another embodiment of the invention in which the invention is incorporated in an operation system for a hoisting device having a different clutch mechanism.

FIG. 8 shows another embodiment of the operation system for a hoisting device in conformity with the invention. In FIG. 8, parts similar to those shown in FIG. 1 are designated by like reference characters.

In the embodiment shown in FIG. 8, the clutch mechanism designated by the reference numeral 100 comprises a clutch cylinder 104 having a spring 102 therein. Unlike the clutch mechanism 8 of the embodiment shown in FIG. 1, the clutch mechanism 100 operates such that the clutch cylinder 104 is extended when hydraulic fluid is supplied thereto to establish the clutch connection and the clutch cylinder 104 is contracted by the biasing force of the spring 102 when the hydraulic fluid is released from the hydraulic cylinder 104 thereby to disengage the clutch connection.

In conformity with the aforesaid construction of the clutch mechanism 100, the first and second directional control valves 60 and 62 are connected in a manner different from the manner of connection thereof shown in FIG. 1. More specifically, the first valve 60 is a 4-port 2-position valve having the operation lever 66, and two primary side ports are connected to the hydraulic pump 50 and reservoir 72 through the lines 68 and 70, respectively, while two secondary side ports are connected to one of two primary side ports of the second valve 62 and one of two primary side ports of the third valve 64 through a line 106 and the line 76, respectively. The second valve 62 is a hydraulically operated 3-port 2-position valve connected at the other primary side port to the hydraulic pump 50 through a line 108 and at the secondary side port to the clutch cylinder 104 through the line 90.

Other parts of the embodiment shown in FIG. 8 are similar to those of the embodiment shown in FIG. 1, so that their description shall be omitted.

In the embodiment shown in FIG. 8, it will be understood that the clutch mechanism 100 operates such that the clutch cylinder 104 is brought into communication with the reservoir 72 to disengage the clutch connection only when the first valve 60 and the second valve 62 are both in the right position or first position, so that the operation system operates substantially in the same manner as the operation system shown in FIG. 1.

In the embodiment shown in FIG. 8, the clutch mechanism 100 disengages the clutch connection if the prime mover is rendered inoperative during lifting and lowering operations. When this is the case, however, the automatic brake mechanism is turned on at all times, so that the suspended load can be held in position.

The operations of the embodiment shown in FIG. 8 can be shown in tabulated form in Tables III and IV below, as is the case with those of the embodiment shown in FIG. 1 tabulated in Tables I and II.

TABLE III

Operations of the hoisting device by means of the foot pedal 16 by turning off the automatic brake mechanism 26 (positive brake operation, with the first valve 60 in the right or first position)

| Operation Lever 56 | Clutch | Automatic Brake | Positive Brake | Operation of Hoisting Device |
|---|---|---|---|---|
| Neutral | On | Off | On | Holding of Suspended Load |
|  |  |  | Off | Free Fall |
| Lifting | On | Off | Off | Lifting |

TABLE III-continued

Operations of the hoisting device by means of the foot pedal 16 by turning off the automatic brake mechanism 26 (positive brake operation, with the first valve 60 in the right or first position)

| Operation Lever 56 | Clutch | Automatic Brake | Positive Brake | Operation of Hoisting Device |
|---|---|---|---|---|
| Lowering | On | Off | Off | Lowering (Power Lowering) |
| Prime Mover Shut Down During Lifting and Lowering | Off | On | Off | Suspended Load Held |

TABLE IV

Operations of the hoisting device by turning on the automatic brake mechanism 26 (negative brake operation, with the first valve 60 in the left or second position)

| Operation Lever 56 | Clutch | Automatic Brake | Positive Brake | Operation of Hoisting Device |
|---|---|---|---|---|
| Neutral | On | On | Off | Holding of Suspended Load |
| Lifting | On | Off | Off | Lifting |
| Lowering | On | Off | Off | Lowering (Power Lowering) |
| Prime Mover Shut Down During Lifting and Lowering | Off | On | Off | Suspended Load Held |

In the embodiment shown in FIG. 8, the first directional control valve 60 has been shown and described as being a manually operated valve. The invention is not limited, however, to this specific type of first valve 60 and any type of valve, such as a solenoid operated type or hydraulically operated type, may be used as desired so long as the valve 60 can shift its position as desired. Also, the second and third directional control valves 62 and 64 may be of the solenoid operated type and adapted to be actuated by switches linked to the operation lever 56, for example to be brought to open and closed positions.

It will be understood that, although not shown, the embodiment shown in FIG. 8 can be modified in the same manner as the embodiment shown in FIG. 1 has been modified as shown in FIGS. 2-7.

Still another embodiment in which the invention is incorporated in an operation system for a hoisting device having a foot brake mechanism of a special construction will be described by referring to FIGS. 9-13.

FIGS. 9-12 show the general construction of the operation system for a hoisting device having a foot brake mechanism of a special construction, in which the numeral 200 designates a brake drum secured to a hoisting drum, not shown, having a brake band 202 extending around an outer periphery of the brake drum 200, the brake band 202 being secured at one end thereof through a pin to a support 204 and connected at the other end thereof through a pin to one end of a lever 208 pivotally mounted on a support 206. The lever 208 has an end portion thereof near the brake band 202 connected to a tension spring 210 operative to loosen the brake band 202 and has an intermediate portion thereof connected to a rod 212 formed with a slot 214 at one end receiving therein a pin 216 attached to the lever 208. The lever 208 also has its end portion remote from the brake band 202 connected to a push rod 218 formed with a slot 220 receiving therein a pin 222 attached to the lever 208. The rod 212 has a variable pressure reducing valve 224 mounted thereon.

The rod 212 is fitted at the other end in a main rod 226 which is connected through a pin to one end of a foot pedal 230 pivotally mounted on a support 228. The foot pedal 230 has connected thereto a tension spring 234 normally urging the foot pedal 230 to move toward a bolster 232, and the rod 226 has an arm 236 supporting through a pin 240 a link 238 having one end thereof pivotally connected to a rod 242 and the other end thereof pivotally connected to the variable pressure reducing valve 224 while having an intermediate portion thereof pivotally connected through a pin 244 to an intermediate portion of the rod 212. A compression spring 246 is mounted between a spring mounting portion of the rod 242 and a spring mounting portion of the rod 226.

Figure 12:
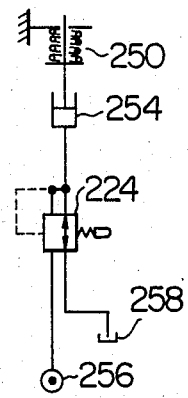
FIG. 12 is a hydraulic fluid circuit diagram showing the position of the variable pressure reducing valve when the brake of the construction shown in FIG. 11 is operative.

Another compression spring 250 is mounted between a spring mounting portion of the push rod 218 and a fixed spring mount 248 and the push rod 218 is connected at an end portion thereof remote from the slot 220 to a brake cylinder 254 pivotally mounted on a support 252. As shown in FIGS. 10 and 12, the brake cylinder 254 is connected through a line and the varable pressure reducing valve 224 to a pressure source (a hydraulic pump, for example) 256 and a reservoir 258 and adapted to have a pressure applied thereto upon actuation of the variable pressure reducing valve 224 to extend against the compression spring 250. The compression spring 250 normally acts to cause the brake cylinder 254 to be contracted and tighten the brake band 202.

FIG. 9 shows the foot brake mechanism in an inoperative position. If the foot pedal 230 is depressed, then the rod 212 and link 238 move in a direction in which the lever 208 is pivotally moved in a counterclockwise direction in which the brake band 202 is tightened while keeping the initial condition upon brake releasing, until the force exerted by the rod 226 becomes equal to the initial biasing force of the compression spring 246. At this time, as shown in FIG. 10, the variable pressure reducing valve 224 mounted on the rod 212 remains to be contracted over its full stroke, so that the pressure of the pressure source 256 continues acting on the brake cylinder 254 to cause the compression spring 250 to be contracted and the biasing force of the compression spring 250 is prevented by the slot 220 of the push rod 218 from being transmitted to the lever 208. Thus, as long as this condition lasts, the force produced by the force with which the foot pedal 230 is depressed is the only brake force available.

Figure 11:
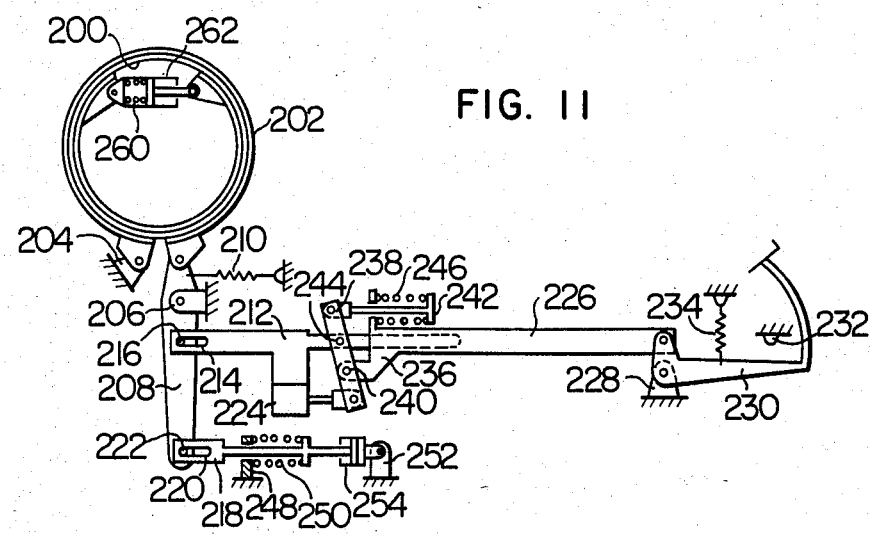
FIG. 11 is a schematic view showing the construction shown in FIG. 9 in a condition in which the brake is operative.

Further depression of the foot pedal 230 increases the force exerted by the rod 226 until such force overcomes the initial biasing force of the compression spring 246. As a result, the compression spring 246 is contracted through the link 238 and rod 242 until the biasing force of the spring 246 becomes equal to the force exerted by the rod 226, causing the rod 226 to move rightwardly, as shown in FIG. 11 with respect to the pin 244 which pivotally connects the rod 212 and link 238 to each other. This extends the variable pressure reducing valve 224 and connects the cylinder 254 to the reservoir 258 so that the pressure of the brake cylinder 254 drops to a balanced level. This extends the compression spring 250 to allow the differential between the force of the spring 250 and the force exerted by the brake cylinder 254 to be transmitted to the lever 208. Thus, the brake force obtained is the sum of a brake force produced by the force with which the foot pedal 230 is depressed and a brake force commensurate with the biasing force exerted by the compression spring 250.

Further depression of the foot pedal 230 causes further contraction of the compression spring 246 and further expansion of the variable pressure reducing valve 224 until the variable pressure reducing valve 224 is brought to a full open position as shown in FIG. 12 and the pressure applied by the brake cylinder 254 becomes zero. Thus, all the biasing force of the compression spring 250 is transmitted to the lever 208 to maximize the brake force.

Stated differently, a brake force produced from the time at which the foot pedal 230 is initially depressed until the variable pressure reducing valve 224 starts to shift its position is commensurate with the force with which the foot pedal 230 is depressed, and a brake force produced after the valve 224 starts to shift its position until the foot pedal 230 is depressed over its full stroke represents the brake force produced by the force with which the foot pedal 230 is depressed plus the brake force produced by the biasing force of the compression spring 250, so that the brake force ultimately obtained is at a high level. The foot pedal 230 is connected to the brake band 202 through rods, a link and a lever, so that the operator can obtain the feeling of applying the brake and it is possible for him to effect fine adjustments of the braking operation based on the feeling. Even if transmission of power becomes impossible during a hoisting operation due to a failure of the prime mover, for example, the pressure of the pressure source (hydraulic pump) 256 is removed simultaneously as such trouble occurs, the brake cylinder 254 is contracted and the brake is applied by the biasing force of the compression spring 250, thereby enabling a fall of the suspended load to be avoided.

The numeral 260 designates a compression spring exerting its biasing force in a direction in which the clutch connection is established for the hoisting drum which is disposed in a clutch cylinder 262 operative to release the clutch connection when hydraulic fluid is supplied thereto.

Figure 13:
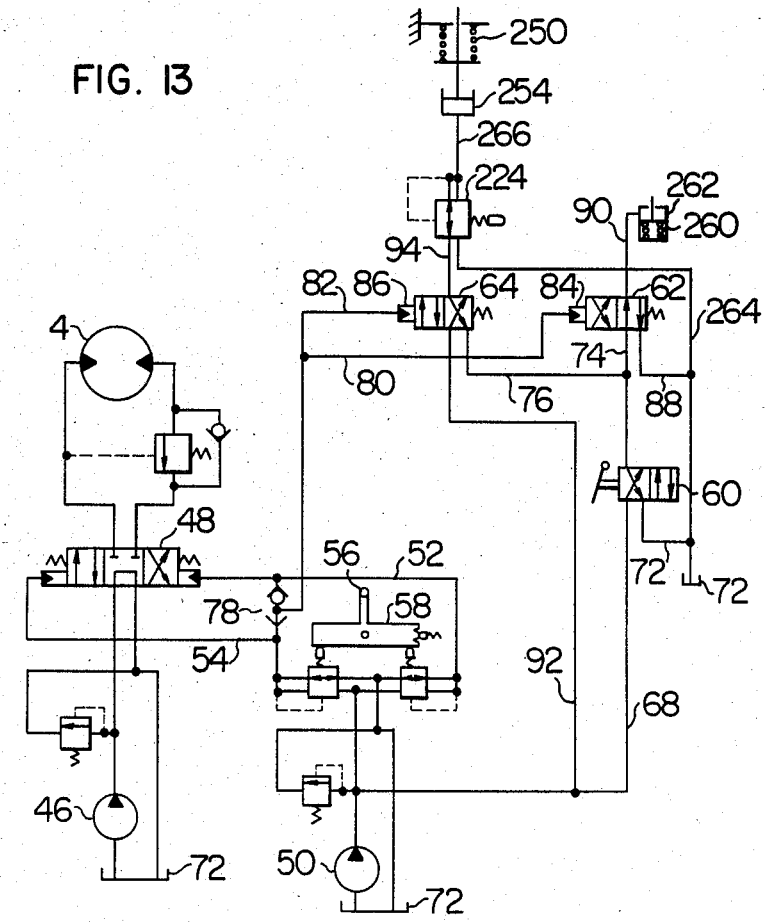
FIG. 13 is a hydraulic fluid circuit diagram similar to FIG. 1 but showing still another embodiment in which the invention is incorporated in the operation systems for the hoisting devices shown in FIGS. 9–12.

FIG. 13 shows an embodiment in which the invention is incorporated in the operation system for the hoisting device of the aforesaid construction. In FIG. 13, parts similar to those shown in FIG. 1 are designated by like reference characters.

In the embodiment shown in FIG. 13, a secondary side port of the second directional control valve 62 is connected, like that of the second valve 62 shown in FIG. 1, to the clutch cylinder 262 shown in FIGS. 9 and 11 through the line 90. A secondary side port of the third directional control valve 64 is connected through the line 94 to one of primary side ports of the variable pressure reducing valve 224 shown in FIGS. 9-12, and the other primary side port of the valve 224 is connected to the reservoir 72 through a line 264 while a secondary side port thereof is connected to the brake cylinder 254 shown in FIGS. 9-12 through a line 266.

Other parts of the embodiment shown in FIG. 13 are similar to those shown in FIG. 1, so that their description shall be omitted. It will be apparent that the brake cylinder 254 and the spring 250 of the embodiment shown in FIG. 13 have the function of an automatic brake mechanism like the automatic brake mechanism 26 of the embodiment shown in FIG. 1.

In the embodiment shown in FIG. 13, the first valve 60 is located in the left or second position as shown when a negative brake operation is performed. In the case, when the operation lever 56 is in a neutral position in which the hydraulic motor 4 is inoperative, no working fluid is supplied to the operation chambers 84 and 86 of the second and third valves 62 and 64, so that these valves are in the right or first position. Thus, the clutch cylinder 262 is in communication with the reservoir 72 through the first and second valves 60 and 62 and the lines 72, 74 and 90, so that the clutch connection is established by the action of the compression spring 260. The brake cylinder 254 is also in communication with the reservoir 72 through the first and third valves 60 and 64, variable pressure reducing valve 224 and lines 72, 76, 94 and 266, so that the automatic brake mechanism is turned on by the action of the compression spring 250. By manipulating the operation lever 52 in a lifting or lowering direction to drive the hydraulic motor 4, it is possible to supply working fluid to the working chambers 84 and 86 of the second and third valves 62 and 64 through the shuttle valve 78 and the lines 80 and 82, so that the valves 62 and 64 are switched to the left or second position. This causes working fluid to be supplied to the brake cylinder 254 through the lines 92, 94 and 266, third valve 64 and variable pressure reducing valve 224 thereby to release the brake. Meanwhile, the clutch cylinder 262 remains to be in communication with the reservoir 72 through the lines 88 and 90 and second valve 62, so that the clutch connection is kept established to enable lifting or lowering to be performed.

By switching the first valve 60 to the right or first position, the lines 74 and 76 are both brought into communication with the hydraulic pump 50 through the first valve 60 and line 68. If the operation lever 56 is in a neutral position at this time, then the clutch cylinder 262 and brake cylinder are both brought into communication with the working fluid source 50 since the second and third valves 62 and 64 are in the right position, so that the clutch connection and the automatic brake are released. At this time, if the foot pedal 230 is depressed and the variable pressure reducing valve 224 linked thereto is actuated, then the pressure of the hydraulic fluid in the brake cylinder 254 drops so that the brake is applied by a resultant of the force with which the foot pedal 230 is depressed and the biasing force of the compression spring 250, and if the foot of the operator is removed from the foot pedal 230 the brake is released, so that a free fall by a positive brake operation can be performed.

If the foot of the operator is removed from the foot pedal 230 and the operation lever 56 is manipulated in a lifting or lowering direction when the first valve 60 is in the right position, then the working fluid is supplied to the operation chambers 84 and 86 of the second and third valves 62 and 64 to switch these valves to the left position, so that the clutch cylinder 262 is brought into communication with the reservoir 72 through the lines 88 and 90 and second valve 62 and the clutch connection is established. Also, the variable pressure reducing valve 224 is brought into communication with the hydraulic pump 50 through the third valve 64 and lines 92 and 94, so that lifting and lowering of the suspended load by a positive brake operation can be performed.

It will be appreciated that the embodiment shown and described by referring to FIG. 13 offers not only the same advantages as the embodiment shown and described by referring to FIG. 1 but also the additional advantage that a brake force of high magnitude can be produced by a force of low magnitude with which the foot pedal is depressed in a positive brake operation because in the positive brake operation the biasing force of the compression spring 250 is added to the brake force produced by the force with which the foot pedal is depressed.

Although not shown, it is to be understood that the embodiment shown in FIG. 13 can be modified in the same manner as the embodiment shown in FIG. 1 is modified as shown in FIGS. 2–7.

Although not shown, it is to be understood that the clutch mechanism of the embodiment shown in FIG. 13 can be replaced by a clutch mechanism of the type in which a spring acts in a direction in which the clutch connection is released and the clutch connection is established when hydraulic fluid is supplied to a clutch cylinder as is the case with the embodiment shown in FIG. 8. It is also to be understood that this embodiment with the clutch mechanism of the different type can be modified in the same manner as the embodiment shown in FIG. 1 is modified as shown in FIGS. 7–12.

From the foregoing description, it will be appreciated that according to the invention it is possible to switch the operation system between a positive brake operation and a negative brake operation merely by selecting the position of the first directional control valve. Also, it is possible to switch the directions of rotation of a hydraulic motor and actuate the clutch merely by actuating the operation means for the hydraulic motor, regardless of whether the brake operation is positive or negative, thereby eliminating the need to provide and manipulate a clutch lever. This facilitates actuation of the operation system and eliminates misoperation.

When a suspended load is held by means other than the foot brake, the automatic brake is relied on at all times, so that it is possible to do without the use of a hydraulic brake comprising a hydraulic motor and a counterbalance valve mounted in the circuit of the hydraulic motor, thereby ensuring that fall of the suspended load is positively prevented.

What is claimed is:

1. An operation system for a hoisting device comprising, in combination: a hoisting device; a hydraulic motor for driving the hoisting device; a hydraulic fluid source; a reservoir; clutch means for connecting and disconnecting said hydraulic motor and said hoisting device, said clutch means including clutch cylinder means and spring means operative such that when the clutch cylinder means is in communication with the reservoir, the spring means performs one of clutch connection and clutch disconnection, and when the clutch cylinder means is in communication with the hydraulic fluid source, the clutch cylinder means performs the other of clutch connection and clutch disconnection with a hydraulic fluid supplied from the hydraulic fluid source; foot brake means for applying a brake to the hoisting device by the control of an operator, and automatic brake means for applying an automatic brake to the hoisting device, said automatic brake means including brake cylinder means and spring means operative such that when the brake cylinder means is in communication with the reservoir, the spring means applies the brake, and when the brake cylinder means is in communication with the hydraulic fluid source, the brake cylinder means releases the brake with a hydraulic fluid supplied from the hydraulic fluid source; wherein said operation system further comprises:

(a) first, second and third directional control valve means each having a first position and a second position, said first, second and third valve means being connected between the hydraulic fluid source and reservoir and the clutch and brake cylinder means to operate such that only when the first and second valve means are both in the first position, the clutch cylinder means is brought into communication with one of the hydraulic fluid source and the reservoir which serves for the clutch disconnection thereby to cause the clutch means to be disconnected, and only when the first valve means is in the second position and the third valve means is in the first position, the brake cylinder means is brought into communication with the reservoir to cause the automatic brake means to apply the brake; and (b) first, second and third operation means for operating the first, second and third directional control valve means respectively;

(c) the second and third operation means being operative in response to inoperation and operation of the hydraulic motor in such a manner that when the hydraulic motor is inoperative, the second and third valve means are in the first position, and when the hydraulic motor is operative, the second and third valve means are in the second position.

2. An operation system for a hoisting device as claimed in claim 1, wherein said clutch means is of the type operative such that when the clutch cylinder means is in communication with the reservoir, the spring means performs the clutch connection, and when the clutch cylinder means is in communication with the hydraulic fluid source, the clutch cylinder means performs the clutch disconnection with a fluid supplied from the hydraulic fluid source; said first directional control valve means is connected such that when it is in the first position, it brings the hydraulic fluid source into communication with the second and the third directional control valve means, and when it is in the second position, it brings the reservoir into communication with the second and third directional control valve means; the second directional control valve means is connected such that when it is in the first position, it brings the first directional control valve means into communication with the clutch cylinder means, and when it is in the second position, it brings the reservoir into communication with the clutch cylinder means; and the third directional control valve means is connected such that when it is in the first position, it brings the first directional control valve means into communication with the brake cylinder means, and when it is in the second position, it brings the hydraulic fluid source into communication with the brake cylinder means.

3. An operation system for a hoisting device as claimed in claim 1, wherein the clutch means is of the type operative such that when the clutch cylinder means is in communucation with the reservoir, the spring means performs the clutch disconnection, and when the clutch cylinder means is in communication with the hydraulic fluid source the clutch cylinder means performs the clutch connection with a hydraulic fluid supplied from the hydraulic fluid source; the first directional control valve means is connected such that when it is in the first position, it brings the reservoir and the hydraulic fluid source into communication with the second and third directional control valve means, respectively, and when it is in the second position, it brings the hydraylic fluid source and the reservoir into communication with the second and third directional control valve means, respectively; the second directional control valve means is connected such that when it is in the first position, it brings the first directional control valve means into communication with the clutch cylinder means, and when it is in the second position, it brings the hydraulic fluid source into communication with the clutch cylinder means; and the third directional control valve means is connected such that when it is in the first position, it brings the first directional control valve means into communication with the brake cylinder means, and when it is in the second position, it brings the hydraulic fluid source into communication with the brake cylinder means.

4. An operation system for a hoisting device as claimed in claim 1, further comprising fourth operation means for operating a main circuit control valve for controlling said hydraulic motor, said second and third operation means being operative to draw out an operation signal of the fourth operation means and operate the second and third directional control valve means in response to said operation signal.

5. An operation system for a hoisting device as claimed in claim 4, wherein said fourth operation means comprises a first hydraulic circuit means for hydraulically operating said main circuit control valve in response to movement of an operation lever, and said second and third operation means comprise a second hydraulic circuit means for hydraulically operating the second and third directional control valve means, said second hydraulic circuit means being connected to said first hydraulic circuit means through a shuttle valve thereby to draw out a hydraulic pressure of said first hydraulic circuit means as said operation signal.

6. An operation system for a hoisting device as claimed in claim 1, further comprising fourth operation means for operating a main circuit control valve for controlling said hydraulic motor, said second and third operation means are operative to draw out as an operation signal a hydraulic pressure of a line portion of the main circuit interposed between the hydraulic fluid source and reservoir and the main circuit control valve and operate the second and third directional control valve means in response to said operation signal.

7. An operation system for a hoisting device as claimed in claim 6, wherein said second and third operation means comprise a hydraulic circuit means for hydraulically operating the second and third directional control valve means, said hydraulic circuit means comprising a fourth directional control valve means operated in response to the hydraulic pressure of said line portion.

8. An operation system for a hoisting device as claimed in claim 1, wherein said first operation means comprises an operation lever for manually operating the first directional control valve means.

9. An operation system for a hoisting device as claimed in claim 1, wherein said first operation means comprises electric circuit means for electromagnetically operating the first directional control valve means.

10. An operation system for a hoisting device as claimed in claim 9, wherein said electric circuit means comprises a manually operated power source switch, a normally open switch adapted to be closed as said foot brake means is depressed, and a relay circuit means adapted to be energized and self-hold when said power source switch is closed and said normally open switch is closed thereby to continue electromagnetically operating the first directional control valve means.

11. An operation system for a hoisting device as claimed in claim 10, including a prime mover for the hydraulic motor for driving the hoisting device, and wherein said electric circuit means further comprises a second normally open switch adapted to be operated in response to operation of the prime mover for the hydraulic motor in such a manner that it is closed only when the prime mover is in operation.

12. An operation system for a hoisting device as claimed in claim 11, wherein said second normally open switch comprises a pressure switch adapted to be operated in response to a pressure of the hydraulic fluid source.

13. An operation system for a hoisting device as claimed in claim 11, wherein said second normally open switch comprises a pressure switch adapted to be operated in response to a pressure of a lubricant circuit of the prime mover.

14. An operation system for a hoisting device as claimed in claim 1, wherein said hoisting device is plural in number and said first directional control valve means is shared by said plurality of hoisting devices, said second and third directional control valve means each corresponding in number to said hoisting devices and connected in parallel with each other.

15. An operation system for a hoisting device as claimed in claim 1, further comprising a variable pressure reducing valve adapted to have its pressure reduced in accordance with the degree at which the foot brake means is depressed, said variable pressure reducing valve being connected to line means interposed between the brake cylinder and the third directional control valve means.

* * * * *